US011878530B2

(12) United States Patent
Schweid

(10) Patent No.: US 11,878,530 B2
(45) Date of Patent: Jan. 23, 2024

(54) SYSTEM AND METHOD FOR SCHEDULING PRINTHEAD PURGING IN AN INKJET PRINTER

(71) Applicant: Xerox Corporation, Norwalk, CT (US)

(72) Inventor: Stuart A Schweid, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 80 days.

(21) Appl. No.: 17/661,708

(22) Filed: May 2, 2022

(65) Prior Publication Data

US 2023/0347651 A1 Nov. 2, 2023

(51) Int. Cl.
*B41J 2/165* (2006.01)

(52) U.S. Cl.
CPC .................................. *B41J 2/1652* (2013.01)

(58) Field of Classification Search
CPC ...................................................... B41J 2/1652
See application file for complete search history.

(56) References Cited

U.S. PATENT DOCUMENTS 8,162,433 B2 * 4/2012 Ramakrishnan ....... B41J 29/393 347/19
8,419,160 B2 * 4/2013 Mantell .................. B41J 2/2142 347/19
9,463,638 B1 * 10/2016 Kroon .................... H04N 1/407
2003/0081044 A1 * 5/2003 Gomez .................... B41J 2/165 347/23
2005/0168517 A1 8/2005 Usuda
2009/0109257 A1 4/2009 Shimazaki
2012/0194604 A1 8/2012 Tamaki et al.
2013/0241992 A1 9/2013 Shimizu et al.
2022/0371348 A1 * 11/2022 Praharaj ............... B41J 2/16526
2023/0226821 A1 * 7/2023 Barrese ................ B41J 2/16535 347/23

* cited by examiner

*Primary Examiner* — Sharon Polk
(74) *Attorney, Agent, or Firm* — Maginot Moore & Beck LLP

(57) ABSTRACT

A method of inkjet printer operation indicates a need for printhead purging without requiring analysis of printed images to detect streakiness in the images. The method compares terms of a histogram of a filtered response of an inkjet status vector to a streakiness metric to determine whether the distribution of inoperative inkjets in a printhead enables missing ink techniques to be used to compensate for inoperative inkjets in the printhead.

24 Claims, 6 Drawing Sheets

SYSTEM AND METHOD FOR SCHEDULING PRINTHEAD PURGING IN AN INKJET PRINTER

TECHNICAL FIELD

This disclosure is directed to printheads that eject liquid ink to form ink images on substrates as they pass the printheads and, more particularly, to the scheduling of printhead purging in such printers.

BACKGROUND

Inkjet imaging devices eject liquid ink from printheads to form images on an image receiving surface. The printheads include a plurality of inkjets that are arranged in some type of array. Each inkjet has a thermal or piezoelectric actuator that is coupled to a printhead driver. The printhead controller generates firing signals that correspond to digital data for images. Actuators in the printheads respond to the firing signals by expanding into an ink chamber to eject ink drops onto an image receiving member and form an ink image that corresponds to the digital image used to generate the firing signals.

Inkjets, especially those in printheads that eject aqueous inks, need to regularly fire to help prevent the ink in the nozzles from drying. If the viscosity of the ink increases too much, the probability of an inkjet failure increases substantially. During the printing of a print job, sheets are printed with test pattern images at predetermined intervals to evaluate the operational status of the inkjets. An optical sensor generates digital image data of these test pattern images and this digital data is analyzed by the printer controller to determine which inkjets, if any, that were operated to eject ink into the test pattern did in fact do so, and if an inkjet did eject an ink drop whether the drop had an appropriate mass and the location of the ejected drop. Any inkjet not ejecting an ink drop it was supposed to eject or ejecting a drop not having the right mass or landing at an errant position is called an inoperative inkjet in this document. The controller stores data in a database operatively connected to the controller that identifies the inoperative inkjets in each printhead. These sheets printed with the test patterns are sometimes called run-time missing inkjet (RTMJ) sheets and these sheets are discarded from the output of the print job.

Using the data that identifies inoperative inkjets in a printer, a printer controller implements known compensation techniques that use neighboring inkjets to eject ink drops into the area close to where an inoperative inkjet would have ejected ink drops. These additional ink drops obscure the absence of the ink drops that would have been ejected by the inoperative inkjets. A problem occurs when several inkjets become inoperative in close proximity to one another. When this issue arises, the operational inkjets that provide compensating ink can be too far away from one or more of the inoperative inkjets to be effective since several consecutive inoperative inkjets are interposed between a closest operational inkjet and the inoperative inkjet that requires compensation. This problem also occurs in this situation because the closest operational inkjets do not have enough reserve firing capacity to compensate for the ink that would have been ejected by the inoperative inkjet. For example, if one out of every three inkjets is missing, then each operational inkjet near an inoperative inkjet needs to eject 50% more ink. Given that in large areas of dense ink coverage each inkjet is firing up to 80% of the time, the available overhead for the operational inkjets in those areas is only available for compensating ejections 25% of the time. The inability to compensate for the missing ink that would have been supplied by the inoperative inkjets produces streaks in the printed images.

To remediate inkjets in printheads, the printer is taken out of operation so the printheads can be purged. Purging is a process in which air pressure is applied to the ink reservoirs in the printheads to urge ink through the inkjets to remove dried ink and debris from the inkjets so the inkjets are restored to their operational status. Currently, purging is performed when the number of inoperative inkjets reaches an empirically determined threshold. This scheduling approach does not take into account the spatial distribution of the inoperative inkjets. In some scenarios, a few inoperative inkjets can require a purge because they are in close proximity to one another, such as when twenty sequential inkjets become inoperative, while in other scenarios, a larger number of inoperative inkjets can be tolerated because the inoperative inkjets are separated by a distance that enables operational inkjets to compensate for the missing ink. For example, in a printhead having 5,544 inkjets, two hundred and fifty inoperative inkjets could be tolerated if the inoperative inkjets were distributed so every twentieth inkjet was inoperative. Such a distribution of inoperative inkjets enables the remaining operational inkjets to be used for missing ink compensation effectively. Thus, simply counting the number of inoperative inkjets can result in unnecessary purges. Because purging requires that the printer be taken out of operation and ink pushed through the inkjets that does not produce useful production images, it is disruptive to efficient operation of a printer. To address this issue, some printers schedule purging by printing test patterns and evaluating them for streakiness with a metric. In this approach, purges are performed when the visibility of the streakiness of the printer exceeds an acceptable threshold. Unfortunately, this technique does not detect the need for purging until image quality in the prints has degraded to an extent that at least a portion of the print job has to be discarded and reprinted after a purge is performed. Being able to schedule printhead purges shortly before image quality is adversely impacted without erring on the side of purging the printheads too frequently would be beneficial to printer users.

SUMMARY

A new method of operating an inkjet printer schedules purging operations shortly before image quality is adversely impacted. The method includes comparing a spatial distribution of inoperative inkjets in the printhead to a predicted random distribution of inoperative inkjets in the printhead, and generating a signal indicating the printhead is ready for a purge when the spatial distribution of the inoperative inkjets is denser than the predicted random distribution.

A new inkjet printer schedules purging operations shortly before image quality is adversely impacted. The new inkjet printer includes a printhead having a plurality of inkjets, and a controller operatively connected to the printhead. The controller is configured to compare a spatial distribution of inoperative inkjets in the printhead to a predicted random distribution of inoperative inkjets in the printhead, and generate a signal indicating the printhead is ready for a purge when the spatial distribution of the inoperative inkjets is denser than the predicted random distribution.

BRIEF DESCRIPTION OF THE DRAWINGS

The foregoing aspects and other features of operating an inkjet printer to schedule purging operations shortly before image quality is adversely impacted are explained in the following description, taken in connection with the accompanying drawings.

DETAILED DESCRIPTION

Figure 1:
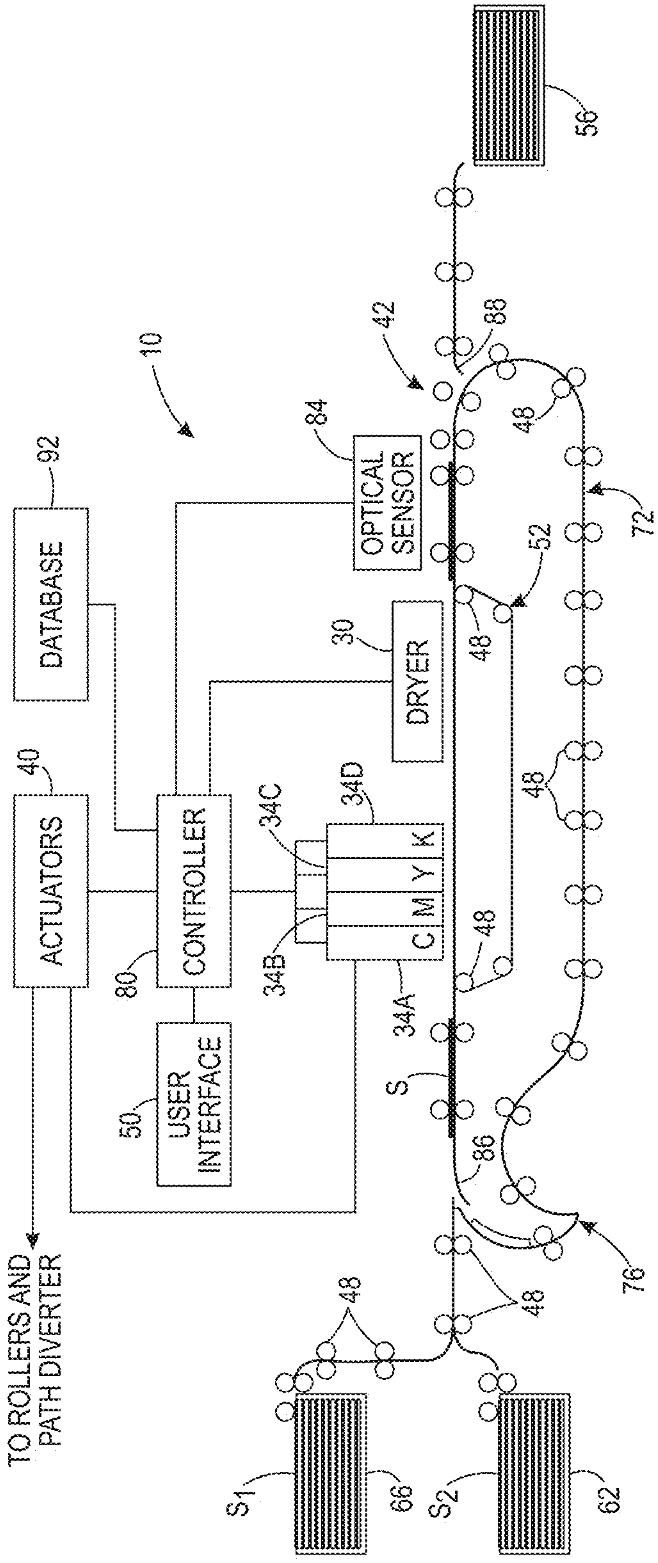
FIG. 1 depicts an inkjet printer that schedules purging operations shortly before image quality is adversely impacted.

For a general understanding of the environment for the system and method disclosed herein as well as the details for the system and method, reference is made to the drawings. In the drawings, like reference numerals have been used throughout to designate like elements. As used herein, the word "inkjet printer" encompasses any apparatus that produces ink images on media by operating inkjets in printheads to eject drops of ink toward the media. As used herein, the term "process direction" refers to a direction of travel of an image receiving surface, such as an imaging drum or print media, and the term "cross-process direction" is a direction that is substantially perpendicular to the process direction along the surface of the image receiving surface.

The printer and method described below uses the data that was generated from the analysis of RTMJ sheets to identify the inoperative inkjets to generate a streakiness metric for a printhead that is compared to a predicted random distribution of the inoperative inkjets for all or a portion of the printhead. In the simplest embodiment, the data identifying the inoperative inkjets is linearly filtered and a histogram of the filtered response is generated that identifies the number of occurrences of different combinations of inoperative inkjets in the printhead. The terms of this histogram are then compared to the terms of a histogram generated with a probability distribution for an acceptable probability failure rate for the printhead and the number of inkjets in the area of the printhead being evaluated to determine if the spatial distribution of the inoperative inkjets is denser than the predicted random distribution. To improve the reliability of the comparison, a percentile histogram is calculated using a Poisson distribution corresponding to the acceptable probability failure rate. The terms of the histogram of the filtered response are compared to this percentile histogram to determine whether the printhead is producing streaky images.

FIG. 1 depicts a high-speed color inkjet printer 10 that schedules purging operations shortly before image quality is adversely impacted. As illustrated, the printer 10 is a printer that directly forms an ink image on a surface of a media sheet stripped from one of the supplies of media sheets $S_1$ or $S_2$ and the sheets S are moved through the printer 10 by the controller 80 operating one or more of the actuators 40 that are operatively connected to rollers or to at least one driving roller of conveyor 52 that comprise a portion of the media transport 42 that passes through the print zone PZ of the printer. In one embodiment, each printhead module has only one printhead that has a width that corresponds to a width of the widest media in the cross-process direction that can be printed by the printer. In other embodiments, the printhead modules have a plurality of printheads with each printhead having a width that is less than a width of the widest media in the cross-process direction that the printer can print. In these modules, the printheads are arranged in an array of staggered printheads that enables media wider than a single printhead to be printed. Additionally, the printheads within a module or between modules can also be interlaced so the density of the drops ejected by the printheads in the cross-process direction can be greater than the smallest spacing between the inkjets in a printhead in the cross-process direction. Although printer 10 is depicted with only two supplies of media sheets, the printer can be configured with three or more sheet supplies, each containing a different type or size of media.

As shown in FIG. 1, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

A duplex path 72 is provided to receive a sheet from the transport system 42 after a substrate has been printed and move it by the rotation of rollers in an opposite direction to the direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Before the printed sheets reach the receptacle 56, they pass by an optical sensor 84. The optical sensor 84 generates image data of the printed sheets and this image data is analyzed by the controller 80 to identify image quality issues in the printed images generated by the printer. The optical sensor 84 can be a digital camera, an array of LEDs and photodetectors, or other devices configured to generate image data of a passing surface. As already noted, the media transport also includes a duplex path that can turn a sheet over and return it to the transport prior to the printhead modules so the opposite side of the sheet can be printed. While FIG. 1 shows the printed sheets as being collected in the sheet receptacle, they can be directed to other processing stations (not shown) that perform tasks such as folding, collating, binding, and stapling of the media sheets.

Operation and control of the various subsystems, components and functions of the machine or printer 10 are performed with the aid of a controller or electronic subsystem (ESS) 80. The ESS or controller 80 is operatively connected to the components of the printhead modules 34A-34D (and thus the printheads), the actuators 40, and the dryer 30. The ESS or controller 80, for example, is a self-contained computer having a central processor unit (CPU) with electronic data storage, and a display or user interface (UI) 50. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In operation, image content data for an image to be produced are sent to the controller 80 from either a scanning system or an online or work station connection for processing and generation of the printhead control signals output to the printhead modules 34A-34D. Along with the image content data, the controller receives print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. As used in this document, the term "print job parameters" means non-image content data for a print job and the term "image content data" means digital data that identifies an ink image containing the image content to be printed on a media sheet.

The method of detecting a need to purge a printhead in an inkjet printer described below compares a spatial distribution of inoperative inkjets in a printhead to a predicted random distribution of inoperative inkjets in the printhead. If the spatial distribution is denser than the predicted random distribution, then a signal is generated that indicates the printhead is in need of a purge. As used in this document, "spatial distribution" means an ordering of the inkjets in the printhead that represents the proximity of the ink drops ejected by the inkjets to one another. As used in this document, "a predicted random distribution of inoperative inkjets" means a distribution of a number of inoperative inkjets corresponding to an acceptable probability failure rate of a number of inkjets in the printhead that is determined using a random function. One random function that can be used to generate a predicted random distribution of inoperative inkjets is a binominal distribution of the probabilities identified using the acceptable probability failure rate and the number of inkjets in a printhead. As used in this document, "denser" a spatial arrangement of inoperative inkjets in a printhead that interferes with missing ink drop compensation techniques to the extent that streakiness appears in the printed images formed by the printhead.

One method for detecting a need for a printhead purge begins with the application of a filter to a pulse train representing the inoperative inkjets in the printhead. The pulse train can be formed as an inkjet status vector with a length equal to the number of inkjets in a printhead. Locations in the inkjet status vector that correspond to operational inkjets are assigned a value of 0, while locations in the vector corresponding to inoperative inkjets are assigned a value of 1. For example, if inkjet 300 and inkjet 700 were the only inoperative inkjets in a printhead having 5,544 inkjets, then the inkjet status vector is 5,544 bits long and bit locations [300] and [700] are set to 1 while the remaining locations in the vector are set to 0. From empirical analysis of prints generated by printheads having 5,544 inkjets, an acceptable probability failure rate of 4% of the number of inkjets can be tolerated provided the inoperative inkjets are dispersed about the printhead in a roughly random pattern. One way to determine whether the distribution of the inoperative inkjets in a printhead up to the acceptable probability failure rate are approximately randomly dispersed is to compare a histogram of a filtered response of an inkjet status vector to a predicted random distribution of inoperative inkjets at the acceptable probability failure rate. If one of the histogram values exceeds the corresponding element in the predicted random distribution, then the distribution of inoperative inkjets not sufficiently random to support known missing ink compensation techniques.

Figure 2A:
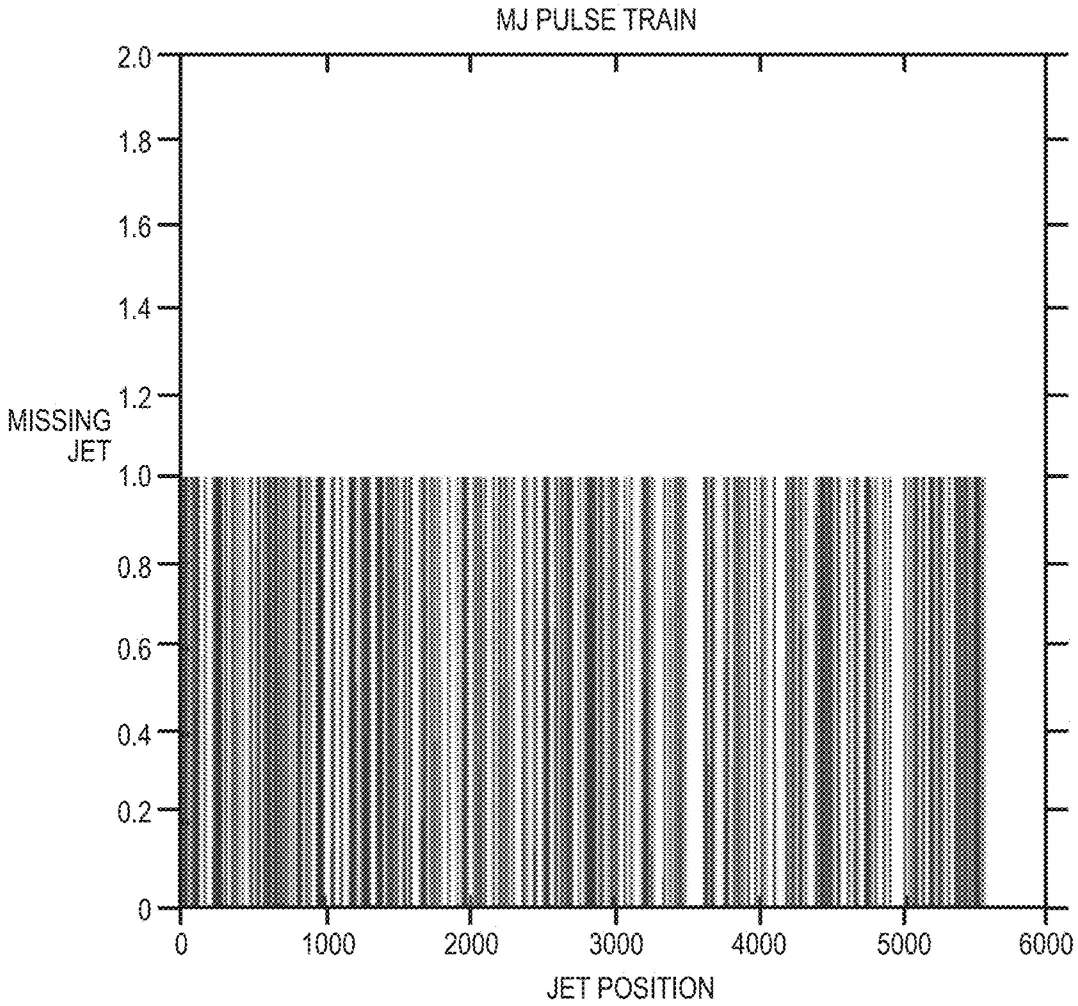
FIG. 2A depicts a graph of an inkjet vector using data that identifies inoperative inkjets in a printhead.
Figure 2B:
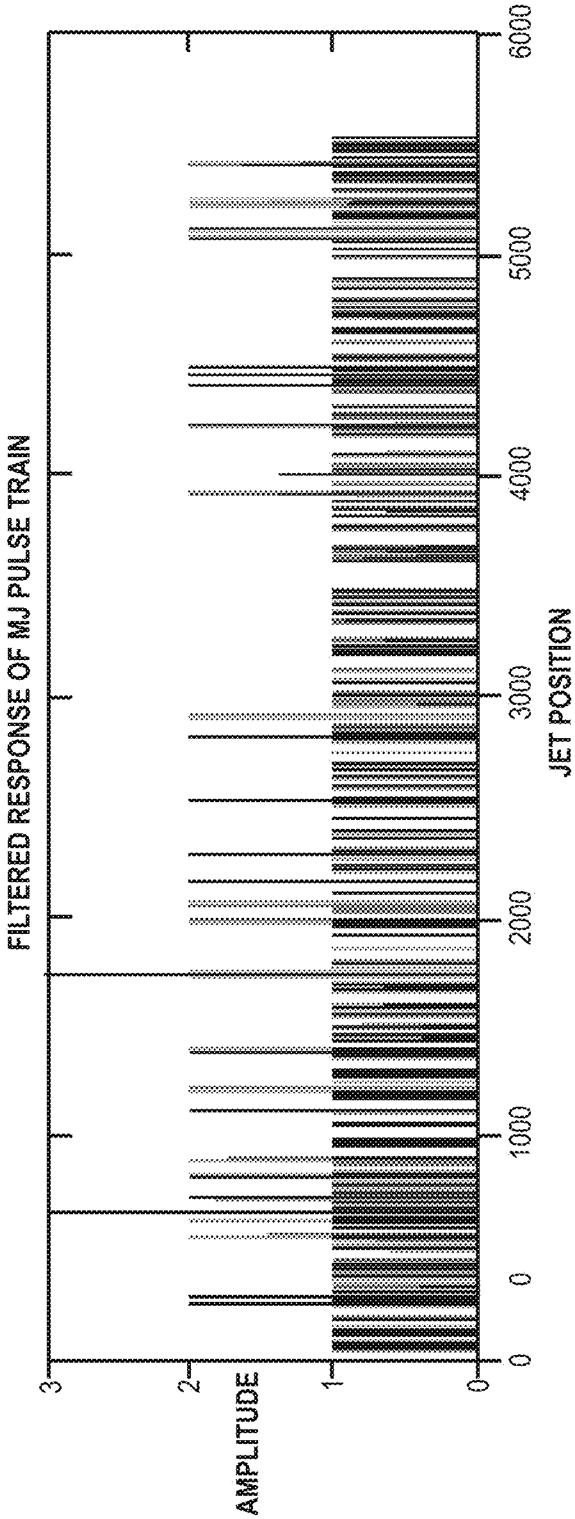
FIG. 2B is the response of the inkjet vector of FIG. 2A with a rectangular filter having four elements.
Figure 2C:
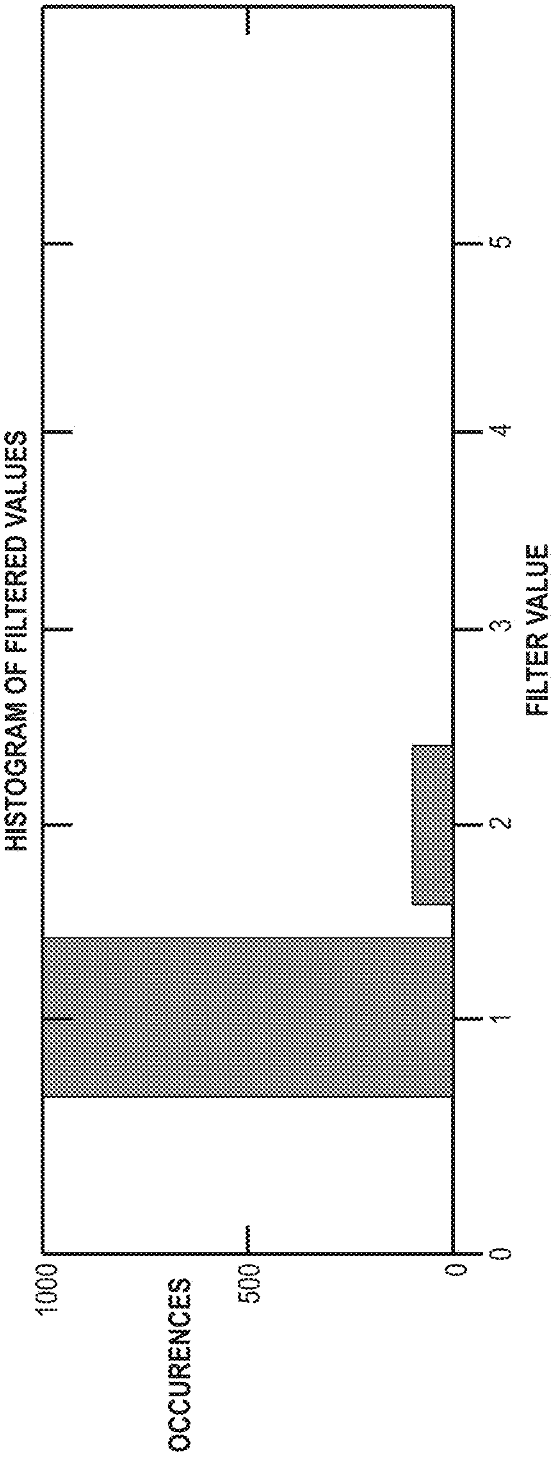
FIG. 2C is a histogram of the filtered vector response of FIG. 2B.

For example, FIG. 2A depicts an inkjet status vector for a printhead having 5,544 inkjets using inoperative inkjet identifying data that is generated as noted previously. This inkjet status vector is convolved with a rectangular filter of a fixed length. For evaluating an inoperative inkjet rate of 4% (0.04) or less, a filter having five elements is chosen. As used in this document, a "filter element" means a coefficient in a filter equation. Thus, a five element filter has five coefficients. A graph of a convolution of the inkjet status vector of FIG. 2A with a five element rectangular filter is shown in FIG. 2B. For higher acceptable probability failure rates, the number of filter elements increases as the probability of having filtered values near or equal to the fifth term in the response can increase significantly. A histogram of the filtered vector is shown in FIG. 2C.

Continuing this example, the acceptable probability failure rate $\lambda$, is 0.04 so the probability that filtered output is equal to N can be calculated from the binomial distribution as:

$$p(N)=\lambda^{N}(1-\lambda)^{5-N}*5!/N!/(5-N)! \quad (1)$$

Multiplying each of the five probabilities by the number of inkjets in the printhead (5,544), a predicted random distribution of the maximum number of inoperative inkjets are represented by a histogram for the acceptable probability failure rate of 0.04, which is:

$$H_{mean}(\text{inoperative\_inkjets})=(942,79,3,0.07,6e-4) \quad (2)$$

As used in this document, the word "term" means one of the numbers in a histogram and the word "corresponding terms" means the first term of one histogram and the first term of another histogram having the same number of terms as the first histogram and so on for all the terms of the two histograms. Whenever any of the five terms of a histogram for the filtered response of FIG. 2B, which is shown in FIG. 2C, is greater than its corresponding term in the histogram of (2), then the distribution of inoperative inkjets is not sufficiently random to be tolerated so a signal is generated to indicate the printhead needs to be purged. The five terms of the histogram of equation (2) correspond to (1) the expected number of isolated inoperative inkjets, (2) the expected number of two inoperative inkjets in a set of five consecutive inkjets, (3) the expected number of three inoperative inkjets in a set of five consecutive inkjets, (4) the expected number of four inoperative inkjets in a set of five consecutive inkjets, and (5) the expected number of five consecutive inoperative inkjets. While this information is useful, many times a printhead having the same number of inkjets has a number of inoperative inkjet occurrences for a particular histogram term that is in excess of the histogram terms shown in equation (2) but the printhead is still operational without producing streaks. Such a condition can occur for about one-half of the times a histogram is generated for the filtered response of the filtered response of the inkjet vector. Thus, a percentile range for the histogram of equation (2) when the failure rate is at the acceptable probability failure rate needs to be determined to address this situation. Comparing the terms in a histogram for the filtered response of the inkjet vector of a printhead to the percentile range can indicate whether the inoperative inkjets are too spatially dense to enable successful compensation for the inoperative inkjets.

To determine the percentile range for the histogram of equation (2), Poisson distribution statistical properties are used. Thus, the variance of the histogram of equation (2) is equal to the mean value so the histogram of (2) has a standard deviation of:

$$\sigma_{histo}=(31,9,2,0.26,0.024) \quad (3)$$

For large mean values, the distribution of the histogram is nearly normal but varies from normal as the values get smaller. Small values do not need to be very accurate since they are quantized to the closest integer because the actual histogram of the filtered response is being evaluated. The Poisson probability distribution can be calculated from:

$$p(H(k)===e^{-Hmean(k)}*\text{Hmean}(k)M/M! \quad (4)$$

and from the probability distribution, the percentiles are determined. To estimate the 99th percentile, an appropriate z value is selected from a z value table to ensure a probability is within a particular section of the probability distribution. Such a table is available at https://www.dummies.com/article/academics-the-arts/math/statistics/how-to-use-the-z-table-147241/. For a 99th percentile calculation, a z value of 2.4 is used. Thus:

$$p99\approx\mu+2.4\sigma \quad (5)$$

and combining this calculation with (2) and (4), the p99 histogram can be approximated as:

$$\text{histo}_{p99}\approx(1015,100,7.6,0.7,0.06) \quad (6)$$

Equation (6) can be used to determine if a spatial distribution of the number of inoperative inkjets is too dense to support ink compensation techniques. In the current example where $\lambda$=0.04 and the number of inkjets is 5,544, the expected number of inoperative jets is about 220. If 220 inoperative inkjets are identified and a histogram of the filtered response is calculated, then there is a 99% confidence that the printhead is still operational if each term of the histogram of the filtered response is less than its corresponding term in the $\text{histo}_{p99}$ of (6). If it is not, then the locations of the inoperative inkjets are sufficiently random for compensation and a signal is generated to indicate the printhead should be purged. That is, if a printhead having a histogram term that is greater than its corresponding term of (6) is used to print ink images, the images will contain streaks even though the total number of inoperative inkjets is acceptable under previously known scheduling techniques that rely on the total number of inoperative inkjets alone.

If the number of inoperative inkjets is less than the maximum rate, which is 220 in the current example, a comparison of the histogram terms of the filtered vector response to histogram terms of equation (6) seems intuitively correct provided all of the histogram terms are less than the histogram terms of equation (6). This intuition is incorrect, however, because the concentration increases as the same filter used above is applied to a smaller number of inkjets. For example, if instead of the expected 220 inoperative inkjets, a quarter of as many inkjets failed, that is, 55 inoperative inkjets occurred. If these 55 inoperative inkjets are located within a quarter of the printhead face, for example, all of the inoperative inkjets are located in the first quarter of the left side of the printhead, then the concentration of those inoperative inkjets is identical to the case where the 220 inoperative inkjets occurred over the entire printhead face. Thus, a comparison of the terms of the filtered inkjet vector response to the terms of the histogram of (6) would give the appearance that the distances between the inoperative inkjets were larger on average. This comparison would find acceptable the occurrence of up to twice as many inoperative inkjets in that quarter of the printhead and still on average pass the comparison of the terms of the filtered inkjet vector response to the terms of the histogram of (6).

So that the number of inoperative inkjets over a portion of the printhead does not skew the comparison evaluation, the number of inoperative inkjets in a section of the printhead is permitted to have the same failure rate as the allowed maximum failure rate. For example, a printhead having 5,544 inkjets can have about 55 identified inoperative inkjets in some portion of the printhead face. At the maximum failure rate of $\lambda$=0.04, this number of inoperative inkjets corresponds to the maximum number of inoperative inkjets expected to be found in a portion of the printhead face containing 1,375 jets (55/0.04). To find the value of the expected acceptable number of inoperative inkjets in 1,375 inkjets, the histogram for the predicted random distribution is recalculated using the probability distribution defined by Equation (1) with $\lambda$=0.04 and the number of inkjets being 1,375 inkjets to get:

$$\text{Hmean}_{sample}=(236,20,0.80.017,1.5e-4) \quad (7)$$

This number is one quarter of Equation (2) result as expected. The same failure rate applied to half as many inkjets produces half as many occurrences for each filter output. The results of (7) are combined with (5) to get:

$$\text{histo}_{p99sample} \approx (272,30,3,0.35,0.03) \approx (8)$$

The terms of this histogram are more than a quarter of the terms of the histogram of equation (6). Several reasons exist why more inoperative inkjets may occur in one part of the printhead than in other parts of the printhead. One key factor is the history of the jobs that were printed. If pages in a print job were printed with denser area coverage in one particular area of the pages while less dense coverage is printed in other areas, then the inkjets ejecting ink into the denser area coverage are well exercised and less likely to drop out because regular operation of inkjets help keep them operational. Conversely, the inkjets ejecting ink into the lighter area coverage section of the print job are less exercised and more likely to fail. Recalculating the histogram based upon the number of inoperative inkjets (as in (8)) ensures that the failure rate in the lesser exercised part of the print job is not "subsidized" by the smaller number of inoperative inkjets in the area of the print job where the inkjets are operated more frequently. That is, calculating the percentile histogram, which in this case is a 99th percentile histogram, for the smaller area ensures that the amount of streakiness in that area of the ink image is attenuated in a measurement of the amount of streakiness in the image as a whole. For example, a perceptible amount of streakiness in one tenth of the page would be attenuated sufficiently in a measurement of the streakiness in the page as a whole that the level of streakiness would be deemed acceptable. This type of printhead evaluation would result in images being printed that have poor image quality in the one-tenth sections of some pages. The recalculation of the percentile histogram ensures this scenario does not happen.

In an alternative embodiment, the histogram terms of (8) can be used to produce an error metric of streak quality. Clearly, if a printhead has more isolated inkjets, which increases the number of separated 1's in the filter response, but fewer occurrences of inoperative inkjet pairs or more, which are represented by filter responses that are >1, the printhead may still not require purging. For example, a controller operating a printhead having 55 inoperative inkjets that are completely isolated from one another within the 5,544 inkjets of the printhead can perform known missing ink compensation techniques to produce acceptable printed images. The histogram resulting from this scenario would be:

$$\text{histo}_{sample} \approx (275,0,0,0,0) \qquad (9)$$

Even though more filter occurrences of 1's are present in the response, no filter occurrences of another combination are produced. This histogram is a better result than the one having a value>0 for all the histogram terms of (8). This means that larger lower filter occurrence terms are allowed if smaller higher filter occurrence terms occur. Instead of a percentile of a histogram of a predicted random probability distribution at an acceptable probability failure rate that is considered a ceiling, an error vector is produced which is:

$$\text{histo}_{p99sample} - \text{histo}_{sample} \qquad (10)$$

In this example using (8) and (9) in the vector of (10) gives:

$$\text{histo}_{p99sample} - \text{histo}_{sample} = (-3,30,3,0.35,0.03) \qquad (11)$$

One way to handle this occurrence is to allow a greater number of isolated inoperative inkjets to occur if fewer pairs of inoperative inkjets occur as long as the decrease in inoperative inkjet pairs is more than the increase in isolated inoperative inkjets. This scenario can be determined by calculating a cumulative sum of the histogram, where the histogram is first flipped so the lower index number corresponds to the higher co-incident pairings of inoperative inkjets. Flipping the histogram of (11) and performing a cumulative sum gives:

$$\text{Histo\_flip} = (0.030.353\ 30 - 3) \qquad (12)$$

$$\text{Histo\_}CDF = (0.03\ 0.38\ 3.38\ 33.8\ 30.8) \qquad (13)$$

The flipped histogram has its first term equal to the difference between the fifth term of 99th percentile histogram (6) and the fifth term of printhead sample histogram (8) (the 5th element corresponds to five consecutive inoperative inkjets). The second value is the difference in the number of times the filter had a value of 4, and so on. The kth cumulative sum (the CDF) is the sum of the first k values of the histo flip error vector. For example, the second term of Histo CDF (13) is the difference between the number of times the p99 (6) had a filter value for 4 OR 5 and the second term of printhead sample (8) had a filter value of 4 OR 5. In this case, if the CDF is always positive, more than one type of failure may occur (e.g., if the p99 number of occurrences of two close inoperative inkjets is less than the measured amount) but only if the number of more significant inoperative inkjets had less occurrences by the same amount or more (e.g., if the number of occurrences of three close inoperative inkjets is fewer in the printhead sample histogram than the number of occurrences of two close inoperative inkjets). In order to use this cumulative sum histogram a corresponding manipulation of the histogram of the filtered inkjet status vector is performed. After a cumulative sum histogram of the histogram of the filtered inkjet status vector is generated, the terms of the two histograms can be compared to determine whether a printhead purging is indicated.

In another alternative embodiment, a single streakiness threshold is produced from the histogram difference between the $99^{th}$ percentile histogram and the histogram of the measured filtered response. Many weightings can be used to generate this metric. Clearly, the weights on the higher filter values must not be less than the weights on the lower filter values, as higher filter values are more significant to the appearance of streakiness in the ink images produced by the printhead. When more data is collected, a machine learning algorithm can identify these weights using either a neural network or a multivariate linear fit, if the amount of data is sufficient.

In one embodiment, the proposed weighting for identifying the single streakiness metric is the reciprocal of the standard deviation of all histogram terms, sometimes called the Manhalanobis distance, which is:

$$\Sigma f(\text{histo}_{p99sample} - \text{histo}_{sample})/\text{sqrt(hmean)} \qquad (13)$$

where f is a function that eliminates any contributions due to quantization as the measured filtered response histogram is always comprised of integers.

The function f is defined as:

$$f(x) = (x-1 \text{ if } x>1, x+1 \text{ if } x<-0.1, 0 \text{ otherwise}) \qquad (14)$$

Figure 3:
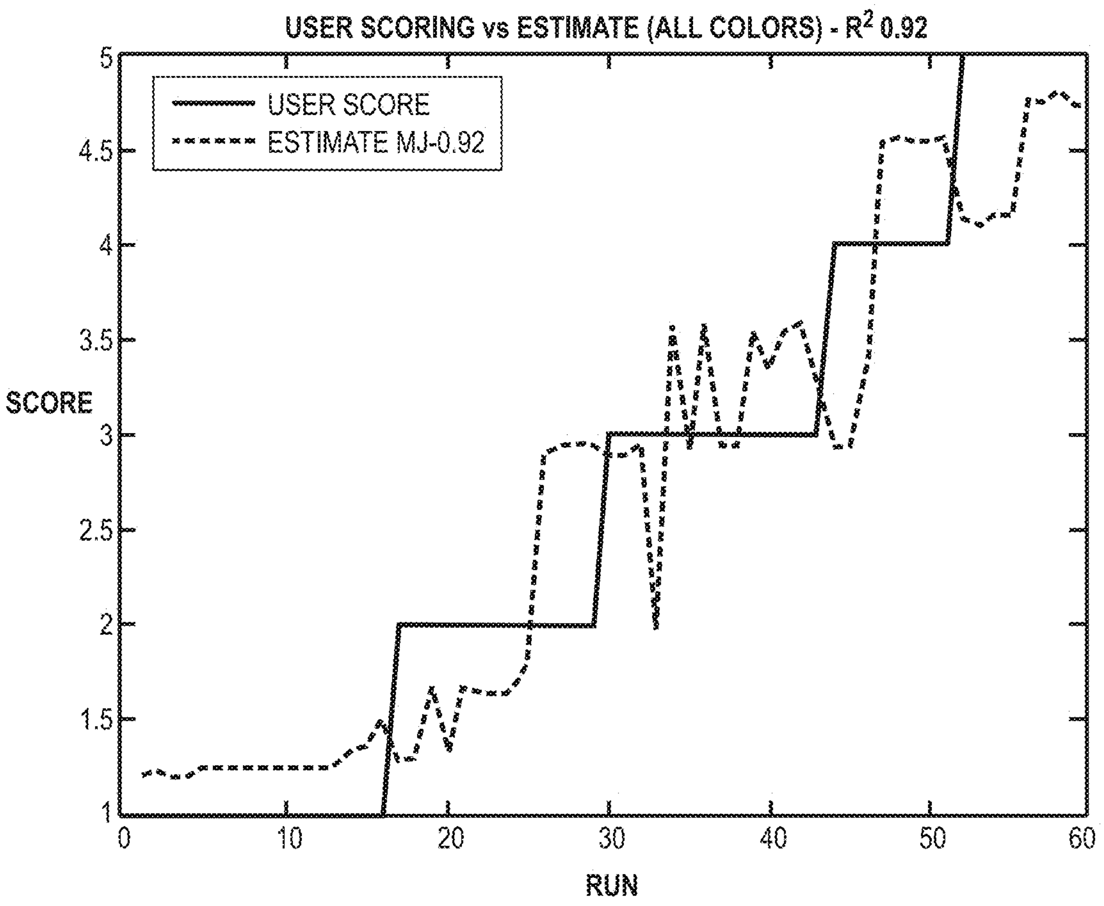
FIG. 3 is a graph comparing the output of a streakiness metric that uses the Manhalanobis distance to weight histogram components used in the generation of the streakiness metric.

Applying this function to the example of (11) results in a metric of 4.66. This function is also applied to the histogram of the filtered inkjet status vector to measure the streakiness currently produced by a printhead. If the streakiness value measured for the current state of the printhead is greater than the metric of the $99^{th}$ percentile histogram as generated above, then the printhead is scheduled for purging. Note that the Manhalanobis weighting in (13) is only a function of the failure rate λ, and not of the number of inoperative inkjets since all of the weights stay in the same proportionality. This metric has been compared with a streakiness score assigned by an expert user by observation of a print job output and has an $R^2$ correlation of over 0.9 as can be seen in FIG. 3.

Figure 4:
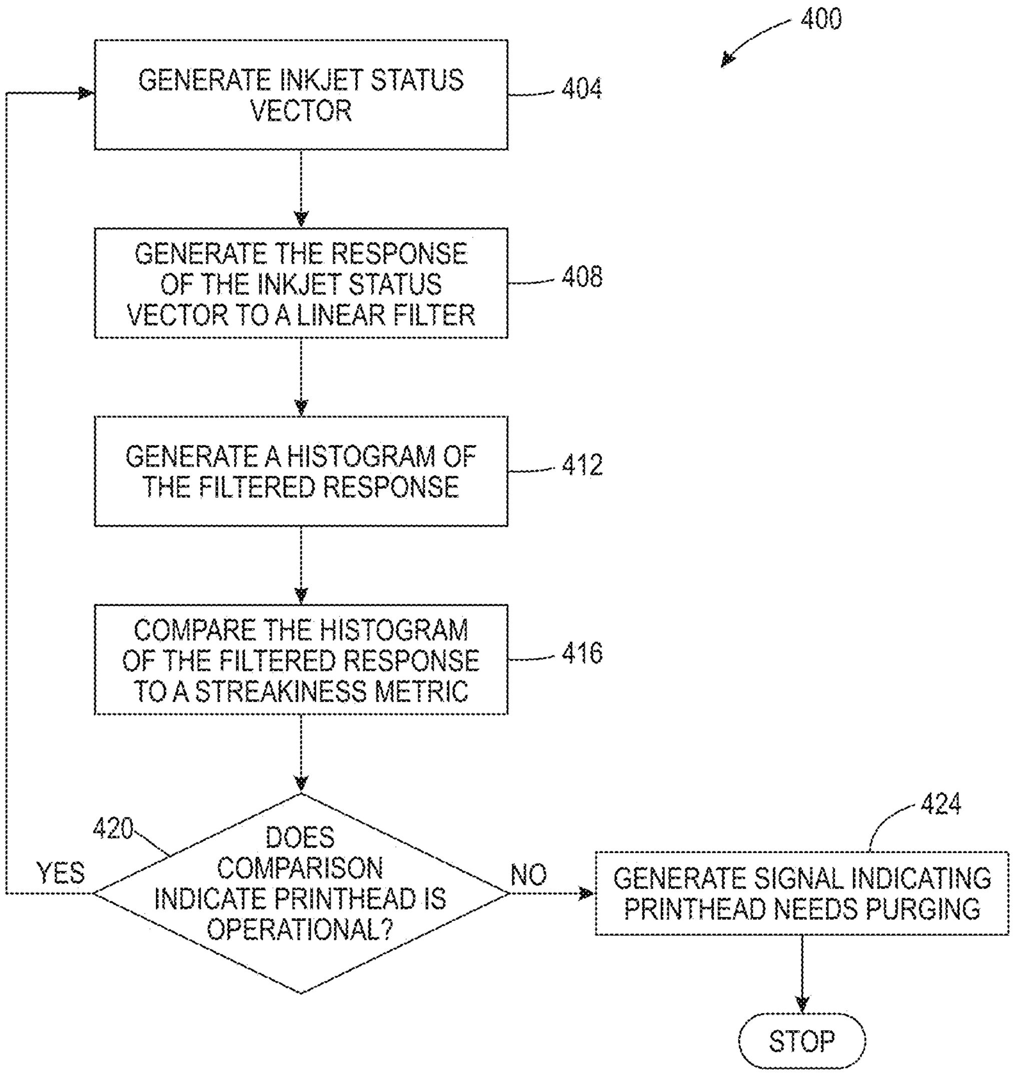
FIG. 4 is a flow diagram of a process used by the controller of the inkjet printer of FIG. 1 to schedule purging operations shortly before image quality is adversely impacted.

A process 400 for identifying a time for purging a printhead in a printer is shown in FIG. 4. In the description of the process, statements that the process is performing some task or function refers to a controller or general purpose processor executing programmed instructions stored in non-transitory computer readable storage media operatively connected to the controller or processor to manipulate data or to operate one or more components in the printer to perform the task or function. The controller 80 noted above can be such a controller or processor. Alternatively, the controller can be implemented with more than one processor and associated circuitry and components, each of which is configured to form one or more tasks or functions described herein. Additionally, the steps of the method may be performed in any feasible chronological order, regardless of the order shown in the figures or the order in which the processing is described.

The process 400 begins by generating an inkjet status vector from the data identifying inoperative inkjets in a printhead (block 404) and filtering the inkjet status vector with a linear filter (block 408). A histogram of the filtered response of the inkjet status vector is generated (block 412). The terms of this histogram are compared to a streakiness metric (block 416). In some cases, as noted above, the comparison is between terms of the histogram of the filtered inkjet status vector or a portion of that vector or a cumulative sum histogram and a histogram generated using an acceptable probability failure rate and a predetermined number of inkjets corresponding to the total of inkjets in a printhead or a portion of the inkjets in the printhead or a cumulative sum histogram of the percentile histogram. In other cases, a single metric value is generated using the Manhalanobis distance as described previously and a corresponding calculation using the histogram of the filtered inkjet status vector is performed to measure the current streakiness produced by the printhead and these two values are compared. If the comparison in any of these cases indicates the printhead is operational (block 420), the process continues (block 404). If the comparison indicates the distribution of inoperative inkjets in the printhead prevents missing ink compensation techniques to be used effectively, a signal is generated to indicate a purge of the printhead is needed (block 424).

It will be appreciated that variants of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed:

1. A method of scheduling a purge operation for a printhead having a plurality of inkjets in an inkjet printer comprising:
- comparing a spatial distribution of inoperative inkjets in the printhead to a predicted random distribution of inoperative inkjets in the printhead; and
- generating a signal indicating the printhead is ready for a purge when the spatial distribution of the inoperative inkjets is denser than the predicted random distribution.

2. The method of claim 1 further comprising:
- generating an inkjet status vector that identifies each inkjet in the plurality of inkjets in the printhead as being operational or inoperative;
- applying a filter having an integer number of elements to the inkjet status vector;
- generating a first histogram of the filtered inkjet status vector to identify the spatial distribution of the inoperative inkjets in the printhead;
- generating a first probability distribution for each element of the filter using an acceptable probability failure rate;
- generating a second histogram for the printhead using the first probability distribution rate and a total number of inkjets in the plurality of inkjets;
- comparing corresponding terms in the first and second histograms; and
- generating a signal indicating the printhead is ready for a purge when one term in the first histogram is equal to or greater than the corresponding term in the second histogram.

3. The method of claim 2 wherein the filter is a rectangular filter.

4. The method of claim 3 wherein the rectangular filter has five filter elements.

5. The method of claim 2 further comprising:
- identifying a standard deviation for the second histogram;
- generating a first percentile histogram using the second histogram and a portion of a first probability distribution corresponding to a first percentile of the first probability distribution;
- comparing terms in the first histogram to corresponding terms in the first percentile histogram; and
- generating the signal when one term in the first histogram is equal to or greater than the corresponding term in the first percentile histogram.

6. The method of claim 5 wherein the first probability distribution is a Poisson probability distribution.

7. The method of claim 6 wherein the percentile histogram is a 99th percentile histogram.

8. The method of claim 7 wherein the percentile of the first probability distribution is 2.4 times the standard deviation of the second histogram.

9. The method of claim 5 further comprising:
- generating a third histogram for the printhead using the first probability distribution and a number of inkjets in the plurality of inkjets that is less than the total number of inkjets in the plurality of inkjets;
- identifying a standard deviation for the third histogram;
- generating a second percentile histogram using the third histogram and a portion of a second probability distribution corresponding to the percentile of the second probability distribution;
- generating a fourth histogram of a inkjet status vector for the number of inkjets that is less than the total number of inkjets;
- comparing terms in the fourth histogram to corresponding terms in the second percentile histogram; and
- generating the signal when one term in the fourth histogram is equal to or greater than the corresponding term in the second percentile histogram.

10. The method of claim 9 further comprising:
- generating a fifth histogram for the printhead using a first probability in the first probability distribution and a probability of zero for the remaining probabilities in the first probability distribution;

generating a sixth histogram by subtracting terms of the third histogram from corresponding terms in the second percentile histogram;

generating a first cumulative sum histogram using the terms of the sixth histogram;

generating a second cumulative sum histogram using the terms of the first histogram;

comparing terms in the second cumulative sum histogram to corresponding terms in the first cumulative sum histogram; and generating the signal when one term in the second cumulative sum histogram is equal to or greater than the corresponding term in the first cumulative sum histogram.

11. The method of claim 10 further comprising:

generating a single streakiness threshold using differences between the terms of the second percentile histogram and the corresponding terms of the fifth histogram and a first weighting of the differences;

generating a single streakiness measurement using differences between the terms of the second percentile histogram and the corresponding terms of the first histogram and a second weighting of the differences;

comparing the single streakiness measurement to the single streakiness threshold; and generating the signal when the single streakiness measurement is equal to or greater than the single streakiness threshold.

12. The method of claim 11 wherein the first weighting of the differences is the Manahalnobis distance of the terms of the second percentile histogram and the terms of fifth histogram and the second weighting of the differences is the Manahalanobis distance of the terms of the second percentile histogram and the terms of the first histogram.

13. An inkjet printer comprising:

a printhead having a plurality of inkjets; and a controller operatively connected to the printhead, the controller being configured to:

compare a spatial distribution of inoperative inkjets in the printhead to a predicted random distribution of inoperative inkjets in the printhead; and generate a signal indicating the printhead is ready for a purge when the spatial distribution of the inoperative inkjets is denser than the predicted random distribution.

14. The inkjet printer of claim 13, the controller being further configured to:

generate an inkjet status vector that identifies each inkjet in the plurality of inkjets in the printhead as being operational or inoperative;

apply a filter having an integer number of elements to the inkjet status vector;

generate a first histogram of the filtered inkjet status vector to identify the spatial distribution of the inoperative inkjets in the printhead;

generate a first probability distribution for each element of the filter using an acceptable probability failure rate;

generate a second histogram for the printhead using the first probability distribution rate and a total number of inkjets in the plurality of inkjets;

compare corresponding terms in the first and second histograms; and generate a signal indicating the printhead is ready for a purge when one term in the first histogram is equal to or greater than the corresponding term in the second histogram.

15. The inkjet printer of claim 14 wherein the filter is a rectangular filter.

16. The inkjet printer of claim 15 wherein the rectangular filter has five filter elements.

17. The inkjet printer of claim 14, the controller being further configured to:

identify a standard deviation for the second histogram;

generate a first percentile histogram using the second histogram and a portion of a first probability distribution corresponding to a first percentile of the first probability distribution;

compare terms in the first histogram to corresponding terms in the first percentile histogram; and generate the signal when one term in the first histogram is equal to or greater than the corresponding term in the first percentile histogram.

18. The inkjet printer of claim 17 wherein the first probability distribution is a Poisson probability distribution.

19. The inkjet printer of claim 18 wherein the percentile histogram is a 99th percentile histogram.

20. The inkjet printer of claim 19 wherein the percentile of the probability distribution is 2.4 times the standard deviation of the second histogram.

21. The inkjet printer of claim 17, the controller being further configured to:

generate a third histogram for the printhead using the first probability distribution and a number of inkjets in the plurality of inkjets that is less than the total number of inkjets in the plurality of inkjets;

identify a standard deviation for the third histogram;

generating a second percentile histogram using the third histogram and a portion of a second probability distribution corresponding to the percentile of the second probability distribution;

generate a fourth histogram of a inkjet status vector for the number of inkjets that is less than the total number of inkjets;

compare terms in the fourth histogram to corresponding terms in the second percentile histogram; and generate the signal when one term in the fourth histogram is equal to or greater than the corresponding term in the second percentile histogram.

22. The inkjet printer of claim 21, the controller being further configured to:

generate a fifth histogram for the printhead using a first probability in the first probability distribution and a probability of zero for the remaining probabilities in the first probability distribution;

generate a sixth histogram by subtracting terms of the third histogram from corresponding terms in the second percentile histogram;

generate a first cumulative sum histogram using the terms of the sixth histogram;

generate a second cumulative sum histogram using the terms of the first histogram;

compare terms in the second cumulative sum histogram to corresponding terms in the first cumulative sum histogram; and generate the signal when one term in the second cumulative sum histogram is equal to or greater than the corresponding term in the first cumulative sum histogram.

23. The inkjet printer of claim 22, the controller being further configured to:

generate a single streakiness threshold using differences between the terms of the second percentile histogram and the corresponding terms of the fifth histogram and a first weighting of the differences;

generate a single streakiness measurement using differences between the terms of the second percentile histogram and the corresponding terms of the first histogram and a second weighting of the differences;

compare the single streakiness measurement to the single streakiness threshold; and generate the signal when the single streakiness measurement is equal to or greater than the single streakiness threshold.

24. The inkjet printer of claim 23 wherein the first weighting of the differences is the Manahalnobis distance of the terms of the second percentile histogram and the terms of fifth histogram and the second weighting of the differences is the Manahalanobis distance of the terms of the second percentile histogram and the terms of the first histogram.

* * * * *